United States Patent [19]
Lohausen

[11] Patent Number: 5,492,162
[45] Date of Patent: Feb. 20, 1996

[54] FITTING SECTION FOR ACCEPTING AND HOLDING VARIOUS SECURING AND/OR MOVING COMPONENTS OF AN AWNING

[75] Inventor: Viktor Lohausen, Oberheinriet, Germany

[73] Assignee: Technolizenz Establishment, Triesen, Liechtenstein

[21] Appl. No.: 277,986

[22] Filed: Jul. 11, 1994

Related U.S. Application Data

[63] Continuation-in-part of PCT/EP93/00051, filed Jan. 12, 1993.

[30] Foreign Application Priority Data

Jan. 13, 1992 [CH] Switzerland .................. 85/92

[51] Int. Cl.$^6$ ................................. E04F 10/00
[52] U.S. Cl. ............................... 160/22; 160/66
[58] Field of Search ................ 160/22, 66, 67, 160/68, 69, 70, 79, 65; 135/89

[56] References Cited

U.S. PATENT DOCUMENTS

| | | |
|---|---|---|
| 4,469,159 | 9/1984 | Lohausen ........................ 160/22 |
| 4,830,531 | 5/1989 | Condit et al. |
| 5,121,782 | 6/1992 | Renkhoff et al. ............... 160/22 |
| 5,232,036 | 8/1993 | Brutsaert ...................... 160/66 X |
| 5,333,663 | 8/1994 | Eger ............................. 160/22 |

FOREIGN PATENT DOCUMENTS

| | | |
|---|---|---|
| 1545852 | 11/1968 | France . |
| 3001919 | 7/1981 | Germany . |
| 8802679 | 5/1988 | Germany . |
| 3820471A1 | 12/1989 | Germany . |
| 1579941 | 11/1980 | United Kingdom . |
| WO88/07115 | 9/1988 | WIPO . |

*Primary Examiner*—David M. Purol
*Attorney, Agent, or Firm*—Oliff & Berridge

[57] ABSTRACT

The invention provides a fitting section for an articulated-arm awning. The fitting section supports various securing and moving components of an awning. Fitting sections according to the invention have at least one or two grooves. A tenon block is inserted into each groove for securing the fitting section to a bearer arm, or for fixing different securing and moving components to the fitting section. The grooves have projections which cooperate with recesses in the tenon blocks. The fitting sections provided are thus small and rotationally and torsionally rigid. The fitting sections can be universally used and stiffened to various degrees.

20 Claims, 8 Drawing Sheets

FITTING SECTION FOR ACCEPTING AND HOLDING VARIOUS SECURING AND/OR MOVING COMPONENTS OF AN AWNING

This is a Continuation-in-part of Application No. PCT/EP93/00051, filed Jan. 12, 1993.

BACKGROUND OF THE INVENTION

1. Field of the Invention

The invention relates to a fitting section for articulated-arm awnings. Fitting sections, also frequently referred to as fitting tubes, are required in articulated-arm awnings to accept the mechanical parts of the articulated-arm awning. Fitting sections therefore support a part of the weight of the awning and absorb a very wide range of mechanical stresses. For this reason, fitting sections should have high torsional strength, should be break-proof and should be generally stable.

2. Description of Related Art

Figure 1:
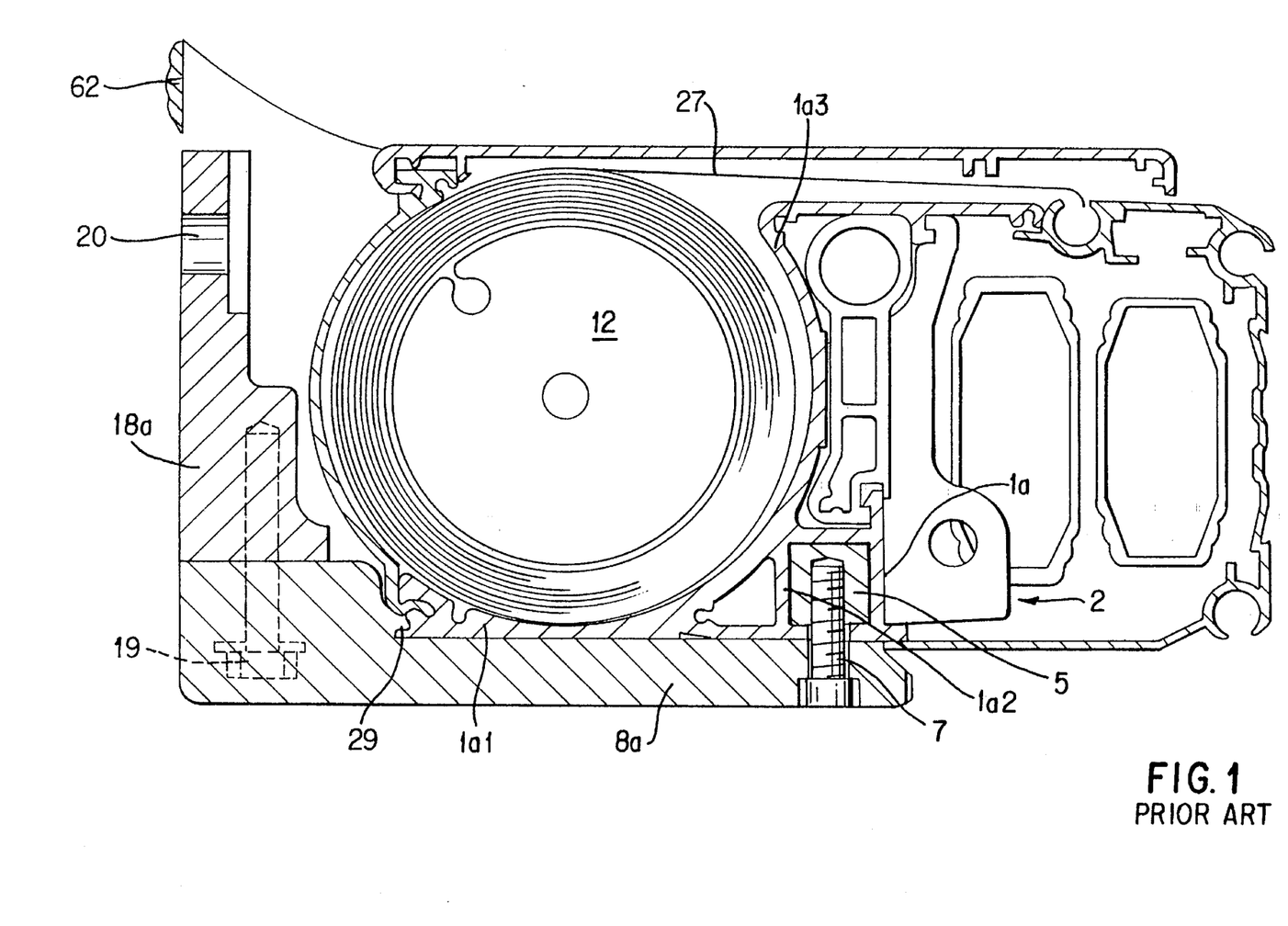
FIGS. 1 and 2 show fitting sections used in conventional awnings.
Figure 2:
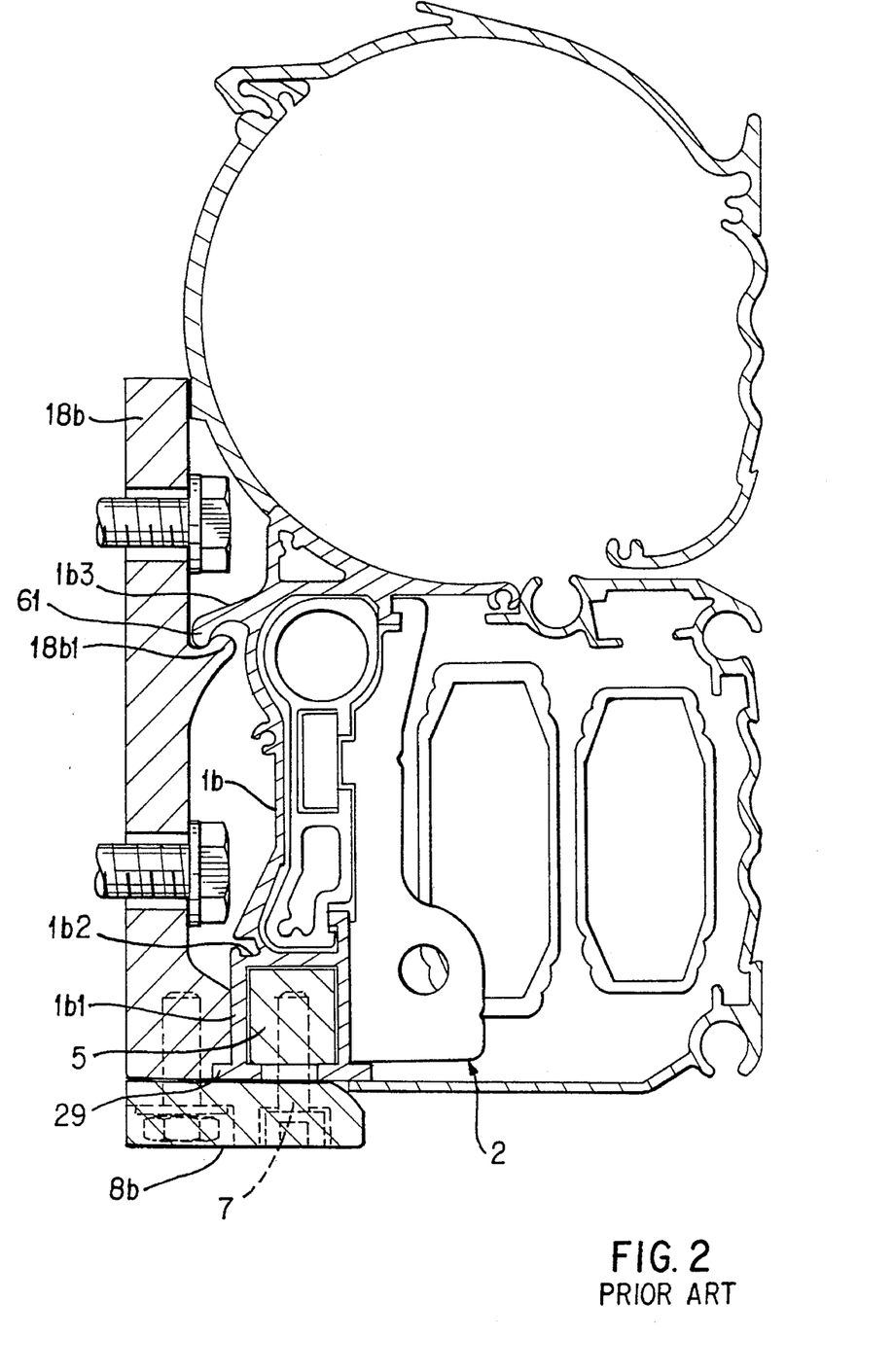

Discus Horizontal and Discus Vertical, two awning systems which have fitting sections, are shown in FIGS. 1 and 2. The two fitting sections shown are formed specially for each intended use, as can be seen from FIG. 1 and FIG. 2. As shown in FIG. 1, the fitting section 1a is a bulky component connected to a bearer arm 8a by a tongue-and-groove connection 29 at a portion 1a1 of the fitting section 1a, and by a screw 7 connection. The screw 7 attaches to a main portion 1a2 of the fitting section 1a by screwing into a tenon block 5 inserted into the main portion 1a2. An upper portion 1a3 of the fitting section 1a serves to stiffen the fitting section 1a and help support securing and moving components 2. Tenon blocks 5 also support arm bearings for swivel arms (not shown) of the awning. When activated, the swivel arms extend and support an awning cloth 27 as the awning cloth 27 is withdrawn from a cloth shaft 12.

In the second device shown in FIG. 2, the fitting section 1b is fixed to a bearer arm 8b by a screw 7 and a tenon block 5. The fitting section 1b is interlocked with a support bracket 18b, which is rigidly connected to the bearer arm 8b, by a tongue-and-groove connection 29 between the bearer arm 8b and the support bracket 18b. A main portion 1b2 of the fitting section 1b supports securing and moving components 2. An upper portion 1b3 of the fitting section 1b is fixed to the bracket 18b by a lug 61 which cooperates with a snap projection 18b1 on the bracket 18b.

These different awning designs require different fitting sections, thus requiring twice the design and production effort to produce the two different awnings.

SUMMARY OF THE INVENTION

Therefore, it is an object of the invention to provide a fitting section which can be used with a variety of awning designs.

Furthermore, the invention provides a fitting section which occupies as small a volume as possible. The fitting section is simple to handle and easy to secure. Moreover, the fitting section has sufficient torsional resistance.

The invention also provides a fitting section which is fixed to a bearer arm in a torsion-free manner by two adjacent screw connections. Thus, the invention eliminates an additional, long projection of the fitting section, (e.g. portion 1a1 required in the prior art shown in FIG. 1), and the need to support the fitting section in a nonrotational and torsion-free manner by direct interlocking with a wall bracket (e.g. the tongue-and-groove connection 29 and lug 61 required in the prior art shown in FIG. 2).

The invention further provides a fitting section requiring little inherent rotational and torsional strength. The fitting section is made torsionally resistant and stable by the cooperation of awning components, each attached to the fitting section by a tenon block inserted into grooves formed in the fitting section. Any notch effects associated with the grooves formed in the fitting section are suppressed.

The invention also provides a fitting section formed in a roughly triangular shape. The triangular shape is particularly compact, and is preferably approximately isosceles. A base surface of the fitting section faces a cloth shaft. A concave curvature of the base surface allows the fitting section to be positioned closely to the cloth shaft, thus saving space.

The invention additionally provides a fitting section composed of at least two separate parts. This fitting section preferably has a continuously thick-walled tube in its interior. Conventional hinge or snap closure devices provide rapid and secure joining of optional covering, facing or stiffening elements to the fitting section.

The invention also provides a fitting section having longitudinal holes and cylindrical tenon blocks which eliminates additional hinges or bearing parts, and allows the placement of hard-wearing inserts in the corresponding longitudinal holes.

The fitting section is preferably made from an extruded, corrosion-resistant aluminum alloy.

BRIEF DESCRIPTION OF THE DRAWINGS

The invention will be described in relation to the following drawings, in which like reference numerals refer to like elements and wherein.

DETAILED DESCRIPTION OF THE PREFERRED EMBODIMENTS

Figures 3, 3A:
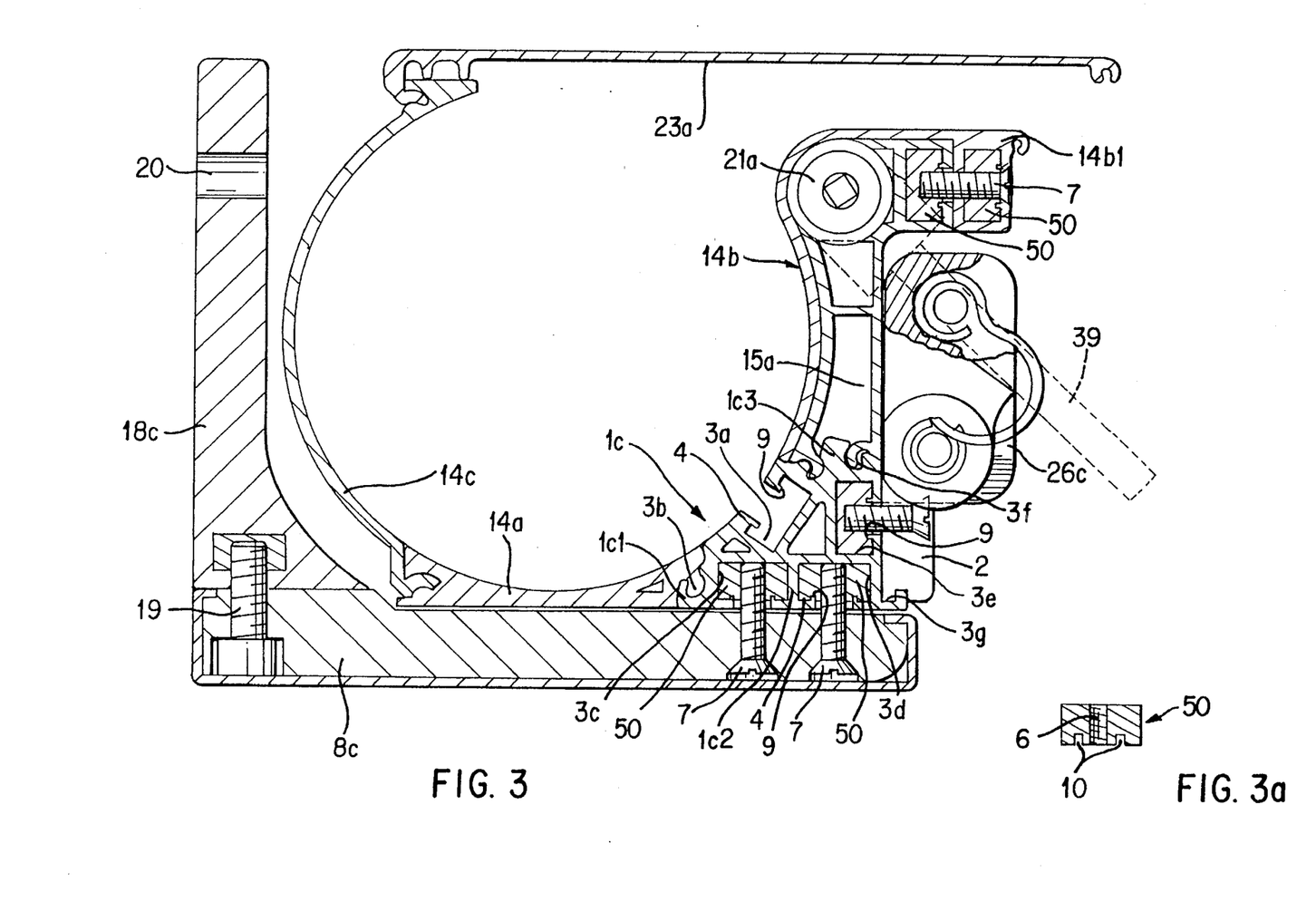
FIG. 3 shows a first embodiment of the fitting section of this invention in a first awning mechanism.
FIG. 3a shows a tenon block from FIG. 3 in detail.

In general, an articulated-arm awning, such as that shown in FIG. 3, is attached to a bearer arm 8c which is connected by means of connector screws 19 to a bracket 18c. The bracket 18c has holes 20 by which the bracket 18c can be secured to a wall 62 using bolts or screws (not shown). The articulated-arm awning also has a fitting section 1c, which is rigidly connected by means of screws 7 to the bearer arm 8c and accepts securing and/or moving components 2 and other components.

A torsional stability of the fitting section 1c is provided by two adjacent screw 7 and tenon block 50 connections. The tenon blocks 50 are inserted into grooves 3c and 3d defined by projections 4. The projections 4 have engagement extensions 9 which engage with corresponding grooves 10 in the tenon blocks 50, as shown in FIG. 3a. Each tenon block 50 also has a threaded hole 6 to receive a screw 7. Jamming of the tenon blocks 50 against the flange-like projections 4 occurs when the screws 7 are tightened and interlocks the tenon blocks 50 with the projections 4.

Thus, the fitting section 1c acts as a completely compact, homogeneous component, even in the case of stresses exerted on one side of the fitting section 1c. For example, if a tension is applied at the notch 3g to the right in the horizontal direction, the resultant forces are completely distributed, via the projections 4 and tenon blocks 50, within a main part 1c2 of the fitting section 1c.

In contrast to the fitting sections in the prior art, two ends 1c1 and 1c3 of the fitting section 1c are provided with grooves 3b and 3f, respectively, into which stiffening elements 15a or facing elements 14a can be inserted or attached. As shown in FIG. 3, the stiffening element 15a supports an awning gear 21a and a shaft 39. The stiffening element 15a is covered by a facing element 14b, which is connected at a projecting end 14b1 of the facing element 14b to the stiffening element 15a by means of a screw 7 and tenon block 50.

Corresponding to the facing elements 14b and 14a, a side of the awning nearest the bracket 18c has a third facing element 14c. The third facing element 14c is connected in its upper region to a facing 23a which forms a roof for the retracted awning. A securing component 2 is fixed to the fitting section 1c by a tenon block 50 inserted into a groove 3e and a screw 7. The securing component 2 carries an extension arm 26c.

Figure 4:
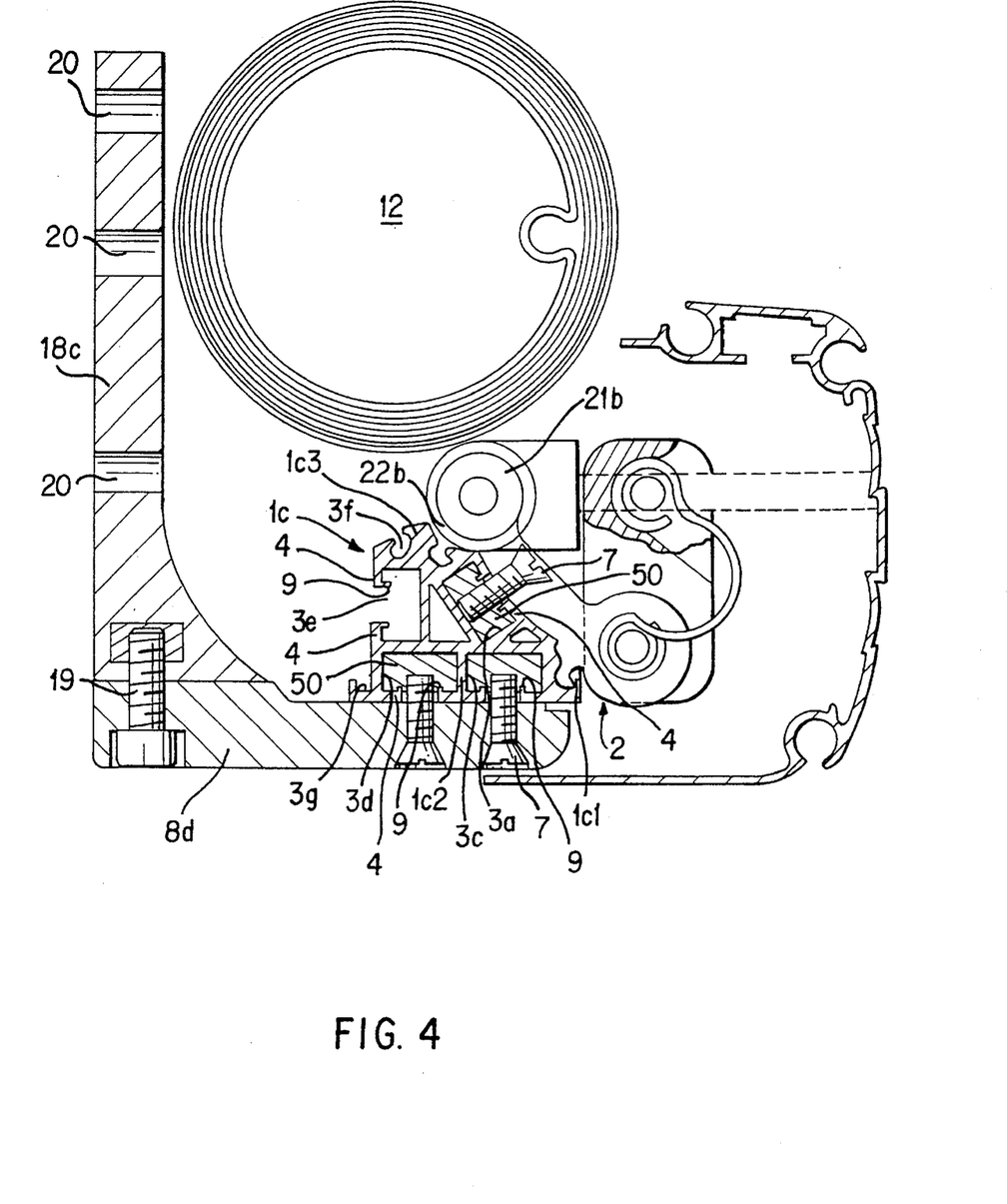
FIG. 4 shows the first embodiment of the fitting section of this invention in a second awning mechanism.

FIG. 4 shows the fitting section 1c in a second awning mechanism. The fitting section 1c is mounted on a bearer arm 8d, directly below the cloth shaft 12. A gear holder 22b is connected to a securing component 2 and carries a gear 21b. Securing component 2 is rigidly connected to the fitting section 1c by a screw 7 and a tenon block 50. The securing component 2 also helps to stiffen the fitting section 1c. However, the tenon blocks 50 also provide a certain stiffening of the fitting section 1c. The amount of stiffening can be varied by altering the length of the tenon block 50. Unused grooves, such as grooves 3e in FIG. 4, can be stiffened by inserting tenon blocks 50 into the groove or covered by snapping covering surfaces (not shown) into the groove.

Figure 5:
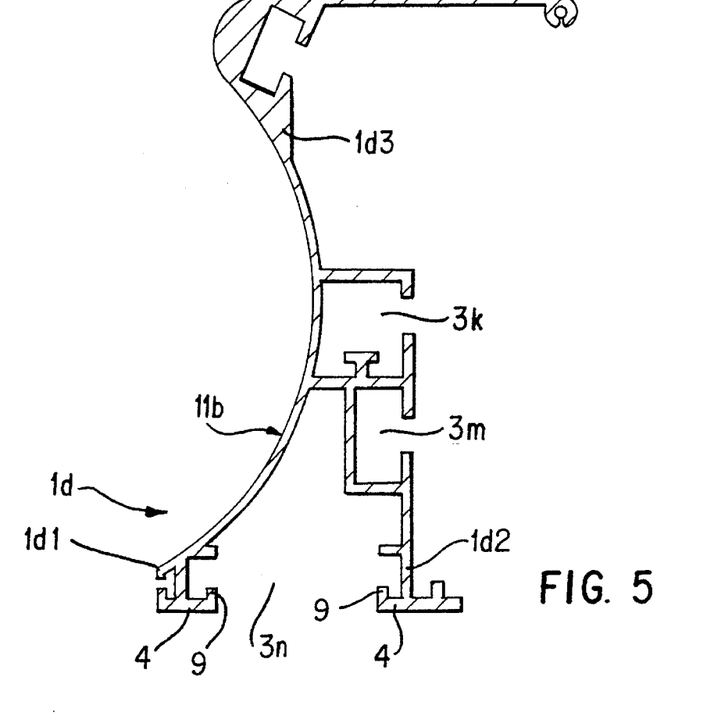
FIG. 5 shows a second embodiment of the fitting section of this invention.

FIG. 5 shows a second embodiment of a fitting section 1d which is formed in two parts 1d3 and 1d2 and has no section closed in the form of a tube. The fitting section 1d is supported and stiffened by inserting tenon blocks 50 into grooves 3k, 3m and 3n. Therefore, the upper part 1d3 is removable from the main part 1d2. Similar to the fitting section 1c in FIGS. 3 and 4, the main part 1d2 of the fitting section 1d is approximately triangular in section. A surface 11b of the main part 1d2 is curved to permit a compact structure by allowing the cloth shaft 12 to be placed close to the fitting section 1d.

Figure 6:
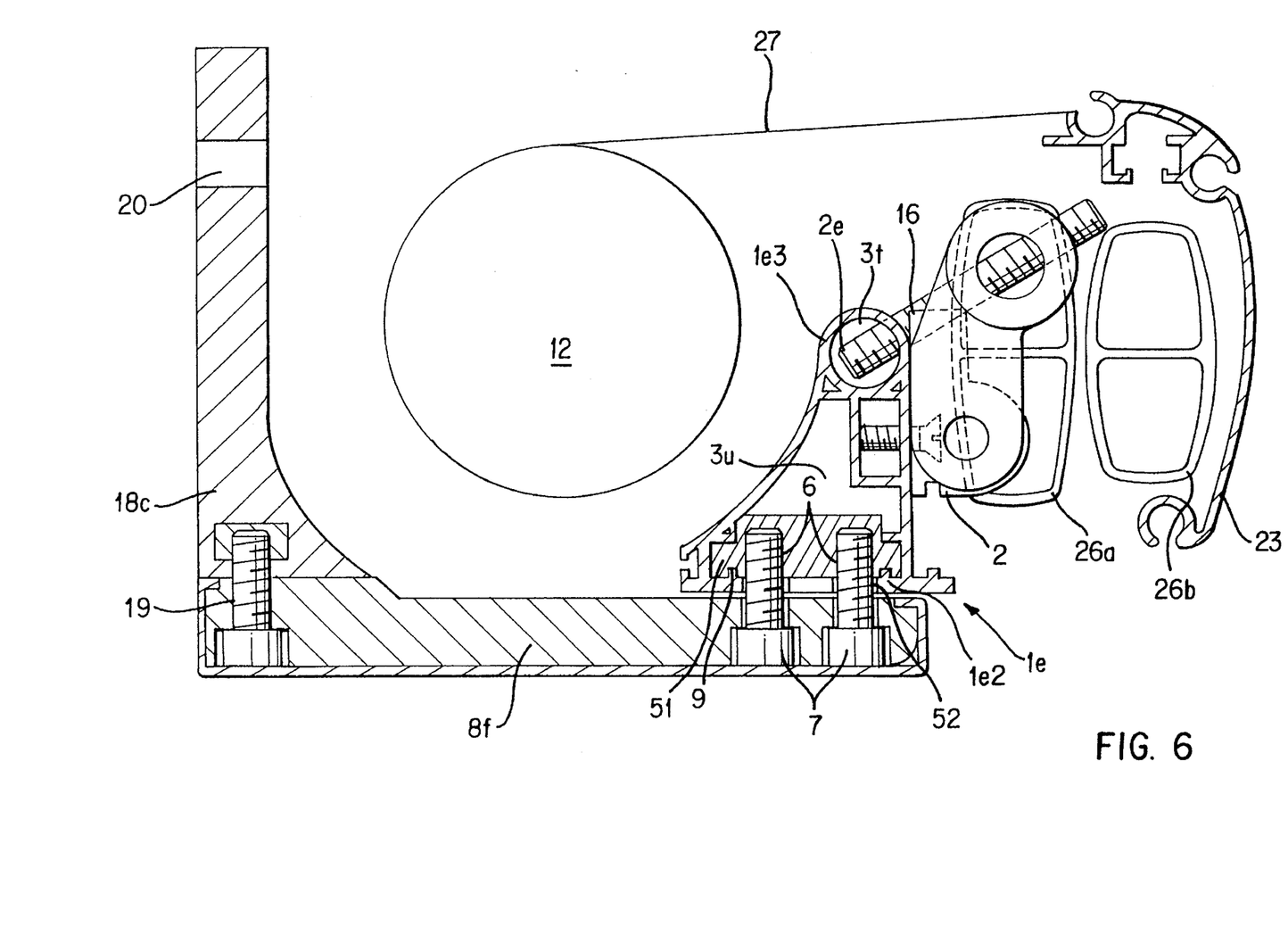
FIG. 6 shows a third embodiment of the fitting section of this invention in a third awning mechanism.

FIG. 6 shows a third embodiment of the invention. A fitting section 1e has a tubular recess 3t formed in an upper part 1e3 in the fitting section 1e. The tubular recess 3t receives a moving component 2e which is connected to a rocker joint 16. A lateral slot (not shown) in a wall of the upper part 1e3 permits swivelling of the rocker joint 16 in the vertical direction.

A securing component 2 carries extension arms 26a and 26b. When activated, the extension arms 26a and 26b urge a facing 23 away from the cloth shaft 12, thereby withdrawing an awning cloth 27 from the cloth shaft 12. The main part 1e2 of the fitting section 1e has no open groove, but instead a tubular recess 3u into which a tenon block 51 is inserted. The tenon block 51 is located, with its two threaded holes 6, directly above holes 52 in a wall of the main part 1e2 and in the bearer arm 8f. Screws 7 are inserted into the holes 52 and engage with the threaded holes 6. Engagement extensions 9 are shown in FIG. 6, but need not be used.

Figure 7:
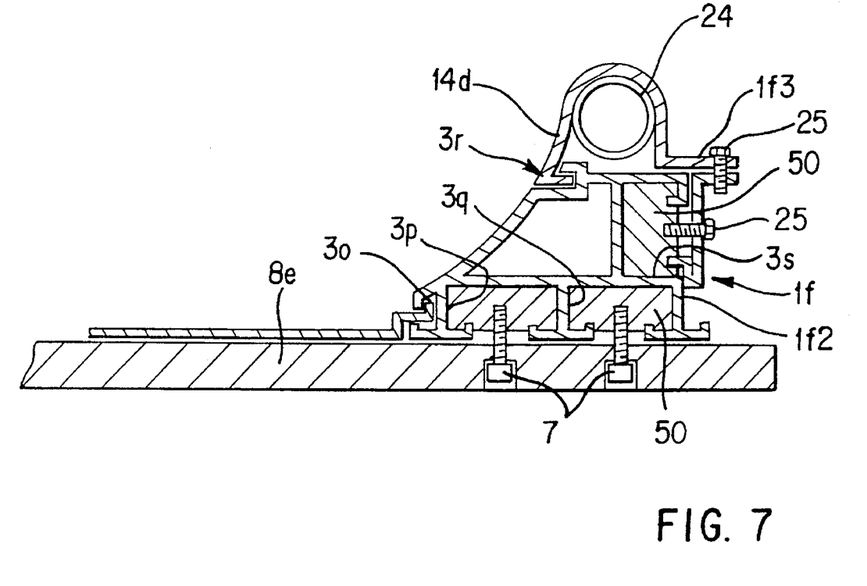
FIG. 7 shows a fourth embodiment of the fitting section of this invention.

FIG. 7 shows a fourth embodiment of a fitting section 1f similar to that in FIG. 6, except that two grooves 3p and 3q are provided in a main part 1f2 of the fitting section 1f. Also, an upper part 1f3 of the fitting section if is not provided with an integral tube recess as in FIG. 6, but instead has a tube 24 held in place by a facing element 14d. The facing element 14d is fixed to the fitting section 1f by a snap closure groove 3r in the upper part 1f3 and by a screw 25 and securing component 53. The securing component 53 is fixed to the fitting section if by a tenon block 50 in a groove 3s in the main part 1f2.

Figure 8:
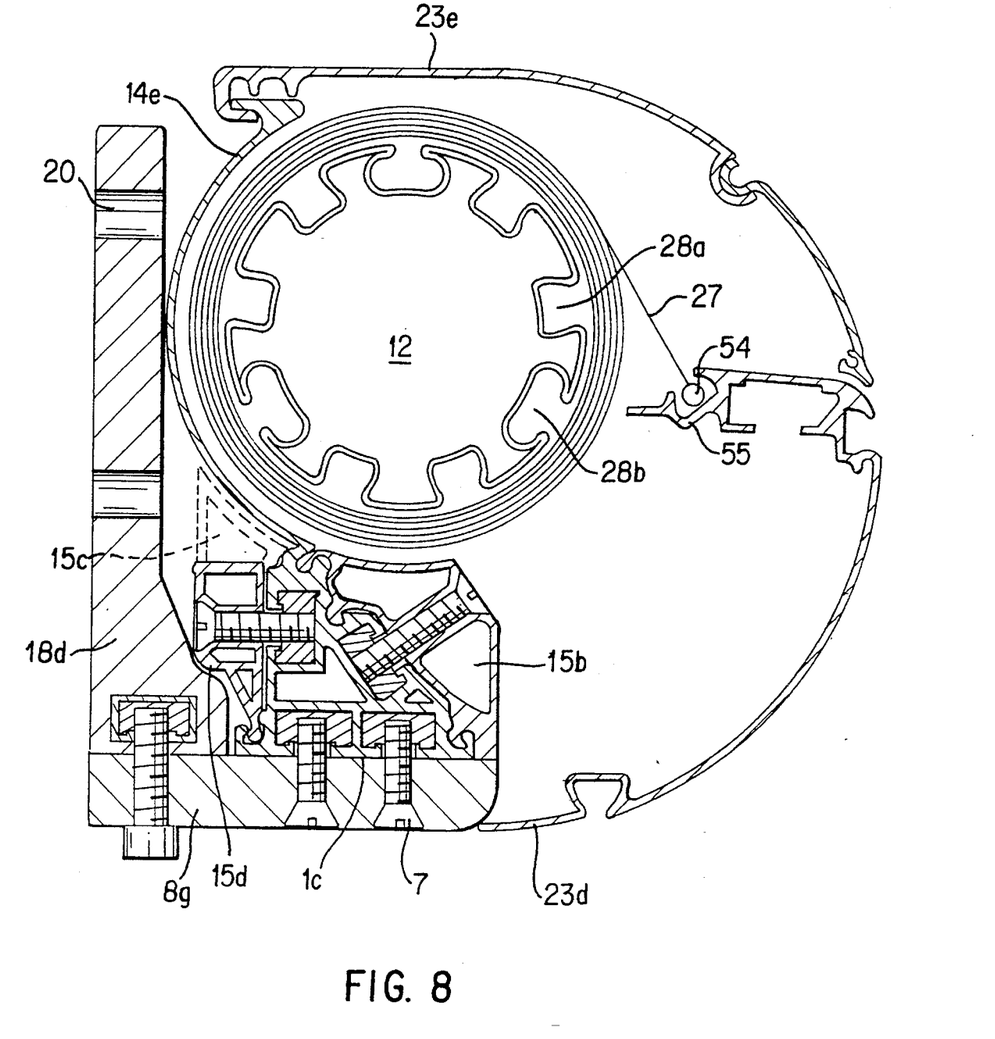
FIG. 8 shows the first embodiment of the fitting section of this invention with stiffening elements in a fourth awning mechanism.

FIG. 8 shows the first embodiment of the fitting section 1c stiffened by three stiffening elements 15b, 15c and 15d. The stiffening elements 15b, 15c and 15d are connected to the fitting section 1c over the entire length of the fitting section 1c or only to portions of the fitting section 1c by tenon blocks 50. The compact design and wide alterability of the fitting section 1c is evident. The stiffening element 15c is indicated by a dash-dot line. A facing element 14e protects the cloth shaft 12 and supports a roof-like facing 23e. The awning cloth 27 is clamped at a welt 54 in a groove 55 in a facing 23d. The cloth shaft 12 is formed of aluminum and has grooves 28a and 28b which stiffen and reduce the weight of the cloth shaft 12.

In addition, the longitudinal grooves 28a and 28b facilitate the drying out of an awning cloth 27 which is wet. Furthermore, the grooves 28a and 28b supply air to an electric drive motor (not shown), which drives the cloth shaft 12. As a result, the motor and the cloth shaft 12 can be made smaller and still provide the same performance.

Undercut longitudinal grooves 28b also facilitate the clamping of the awning cloth 27 to the cloth shaft 12 with the aid of a welt or a key. Conical embodiments of the grooves 28b also permit the insertion of blocks, tenon blocks 50 or the like, which may be provided for securing purposes or for stiffening.

Figure 9:
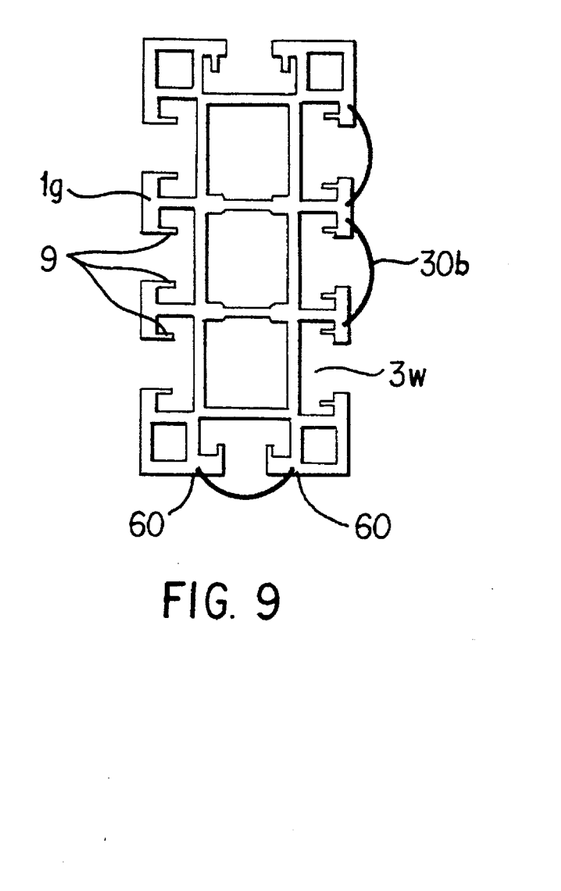
FIG. 9 shows a fifth embodiment of the fitting section of this invention.

FIG. 9 shows a fifth embodiment of a fitting section 1g of this invention. Cover plates 30b are shown snapped into recesses 3w or into grooves 60 formed in the fitting section 1g. Tenon blocks 50 can also be inserted into the recesses 3w for attaching various different components to the fitting section 1g or for stiffening the fitting section 1g.

Figure 10:
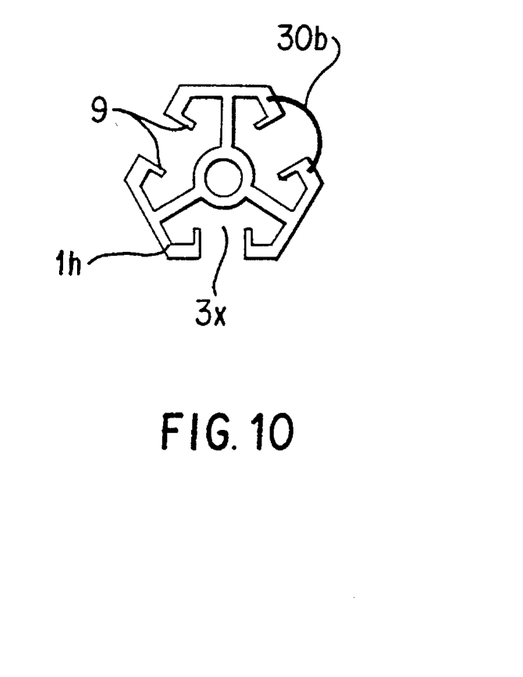
FIG. 10 shows a sixth embodiment of the fitting section of this invention.

FIG. 10 shows a sixth embodiment of a fitting section 1h of this invention. As with the fitting section 1g shown in FIG. 9, cover plates 30b can be used to cover the recesses 3x in the fitting section 1h. Tenon blocks 50 can also be inserted into the recesses 3x.

Figure 11:
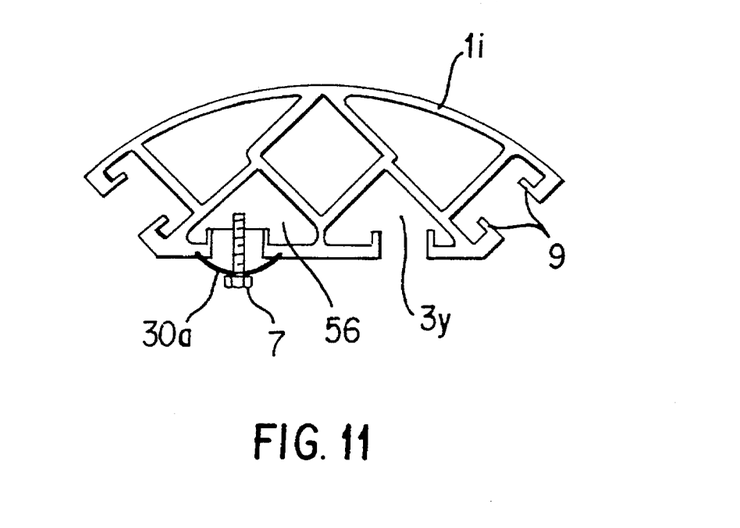
FIG. 11 shows a seventh embodiment of the fitting section of this invention.

FIG. 11 shows a seventh embodiment of a fitting section 1i of the invention. A tenon block 56 is shown inserted into a recess 3y and used to fix a cover plate 30a to the fitting section 1i by a screw 7.

The invention is not limited to the examples described above. In particular, the fitting sections described can also have many other cross-sectional shapes, such as, for example, rectangular shapes.

The fitting section according to the invention can also serve to secure a cloth shaft bearing, a hinge holder and a rail holder for drop-arm and rail-type awnings, particularly when the rails are asymmetric or are displaced towards the middle of the awning.

A further field of use arises, for example, in trade fair construction, where the fitting sections according to the invention are used as frameworks.

I claim:

1. An awning device comprising:

a bearing arm;

at least one tenon block having engagement grooves formed in a surface of the at least one tenon block; and a fitting section having a longitudinal axis and supporting one of awning securing and awning moving components, the fitting section having, at least three faces extending in a direction parallel to the longitudinal axis, tenon block grooves formed in at least two faces of the fitting section, the tenon block grooves shaped to receive the at least one tenon block, and engagement extensions corresponding to each tenon block groove, the engagement extensions extending into the corresponding tenon block groove toward an interior of the fitting section;

wherein the at least one tenon block is inserted into at least one tenon block groove and the engagement extensions corresponding to the at least one tenon block groove engage with the engagement grooves formed in the at least one tenon block when a portion of the fitting section is clamped between the at least one tenon block and the bearing arm.

2. The awning device of claim 1, wherein two tenon block grooves are formed in a face of the fitting section nearest the bearing arm and a tenon block is inserted into each tenon block groove.

3. The awning device of claim 1, wherein the clamped portion of the fitting section is clamped between the at least one tenon block and the bearing arm by a screw engaging with the at least one tenon block and the bearing arm.

4. The awning device of claim 1, wherein a widest face of the fitting section faces a cloth shaft and is curved to accept an outer periphery of the cloth shaft.

5. The awning device of claim 1, wherein the fitting section has at least one tubular hole formed longitudinally through the fitting section.

6. The awning device of claim 5, wherein a tubular hole formed in the fitting section receives at least one cylindrical moving element which acts as a hinge shaft for a rocker joint.

7. The awning device of claim 1, wherein at least one attachment groove is formed in the fitting section, the at least one attachment groove shaped to form one of a hinge connection and a snap closure connection with a portion of one of a covering element, a facing element and a stiffening element.

8. The awning device of claim 1, wherein the fitting section is formed of an extruded, corrosion-resistant alloy.

9. The awning device of claim 1, wherein the fitting section is rolled from sheet metal.

10. The awning device of claim 1, wherein the fitting section has a weatherproof coating.

11. The awning device of claim 1, wherein at least one tenon block groove is covered by one of a cover inserted into the at least one tenon block groove and a cover snapped into cover grooves formed in a face of the fitting section.

12. The awning device of claim 1, wherein the fitting section comprises at least two separate portions.

13. An awning device comprising:

a bearing arm;

at least one tenon block having engagement grooves formed in a surface of the at least one tenon block; and a fitting section having a longitudinal axis and supporting one of awning securing and awning moving components, the fitting section having, at least three faces extending in a direction parallel to the longitudinal axis, tenon block recesses formed in the fitting section near at least two faces of the fitting section, the tenon block recesses shaped to receive the at least one tenon block, and engagement extensions corresponding to each tenon block recess, the engagement extensions extending into the corresponding tenon block recess toward an interior of the fitting section;

wherein the at least one tenon block is inserted into at least one tenon block recess and the engagement extensions corresponding to the at least one tenon block groove engage with the engagement grooves formed in the at least one tenon block when a portion of the fitting section is clamped between the at least one tenon block and the bearing arm.

14. The awning device of claim 13, wherein the clamped portion of the fitting section is clamped between the at least one tenon block and the bearing arm by a screw inserted through a hole formed in the fitting section perpendicular to the longitudinal axis, the screw engaging with the at least one tenon block and the bearing arm.

15. The awning device of claim 13, wherein a widest face of the fitting section faces a cloth shaft and is curved to accept an outer periphery of the cloth shaft.

16. The awning device of claim 13, wherein the fitting section has at least one tubular hole formed longitudinally through the fitting section.

17. The awning device of claim 16, wherein a tubular hole formed in the fitting section receives at least one cylindrical moving element which acts as a hinge shaft for a rocker joint.

18. The awning device of claim 13, wherein at least one attachment groove is formed in the fitting section, the at least one attachment groove shaped to form one of a hinge connection and a snap closure connection with a portion of one of a covering element, a facing element and a stiffening element.

19. The awning device of claim 13, wherein the fitting section comprises at least two separate portions.

20. The awning device of claim 13, wherein the fitting section is formed of an extruded, corrosion-resistant alloy.

* * * * *